(12) United States Patent
Chang et al.

(10) Patent No.: US 9,933,654 B2
(45) Date of Patent: *Apr. 3, 2018

(54) POLARISING PLATE FOR A PLANAR-SWITCH MODE LCD, AND A PLANAR-SWITCH MODE LCD COMPRISING THE SAME

(71) Applicant: LG CHEM, LTD., Seoul (KR)

(72) Inventors: Jun Won Chang, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 61 days.

This patent is subject to a terminal disclaimer.

(21) Appl. No.: 14/826,877

(22) Filed: Aug. 14, 2015

(65) Prior Publication Data

US 2015/0355503 A1    Dec. 10, 2015

Related U.S. Application Data

(63) Continuation of application No. 13/142,224, filed as application No. PCT/KR2009/007810 on Dec. 24, 2009.

(30) Foreign Application Priority Data

Dec. 26, 2008 (KR) .................. 10-2008-0134347
Dec. 23, 2009 (KR) .................. 10-2009-0129654

(51) Int. Cl.
*G02F 1/1335* (2006.01)
*G02F 1/1343* (2006.01)
*G02F 1/13363* (2006.01)
*G02B 5/30* (2006.01)

(52) U.S. Cl.
CPC ....... *G02F 1/133528* (2013.01); *G02B 5/305* (2013.01); *G02B 5/3083* (2013.01); *G02F 1/13363* (2013.01); *G02F 1/134363* (2013.01)

(58) Field of Classification Search
CPC .. G02F 1/1339; G02F 1/1341; G02F 2413/12; G02F 1/133528; G02F 1/134363; G02F 1/13363; G02B 5/305; G02B 5/3083
See application file for complete search history.

(56) References Cited

U.S. PATENT DOCUMENTS

| 5,859,681 | A  | * | 1/1999 | VanderPloeg ....... G02F 1/13363 349/118 |
| 6,292,242 | B1 |   | 9/2001 | VanderPloeg et al. |
| 7,084,944 | B2 |   | 8/2006 | Ito et al. |
| 7,227,602 | B2 |   | 6/2007 | Jeon et al. |
| 7,582,339 | B2 | * | 9/2009 | Kim .......................... C08J 5/18 428/1.3 |

(Continued)

FOREIGN PATENT DOCUMENTS

| JP | 2005-189632 A | 7/2005 |
| JP | 2005189632    | 7/2005 |

(Continued)

*Primary Examiner* — Edward Glick
*Assistant Examiner* — Anthony G Quash
(74) *Attorney, Agent, or Firm* — Dentons US LLP (57) ABSTRACT

A polarizer for use in an IPS-LCD includes: a polarizing element; and a retardation film laminate attached to a surface of the polarizing element. The retardation film laminate includes a combination of a +B film and a −B film or a combination of a +B film and a +A film.

9 Claims, 7 Drawing Sheets

(56) References Cited

U.S. PATENT DOCUMENTS

| | | | |
|---|---|---|---|
| 7,738,063 B2 | 6/2010 | Jeon et al. | |
| 8,743,320 B2 * | 6/2014 | Lee | G02F 1/13363 349/117 |
| 2003/0086040 A1 * | 5/2003 | Tillin | G02F 1/1396 349/117 |
| 2005/0110933 A1 | 5/2005 | Jeon et al. | |
| 2005/0140900 A1 | 6/2005 | Jeon et al. | |
| 2005/0200792 A1 * | 9/2005 | Jeon | G02F 1/134363 349/141 |
| 2006/0119775 A1 | 6/2006 | Nakata et al. | |
| 2006/0285051 A1 | 12/2006 | Jeon et al. | |
| 2007/0091228 A1 * | 4/2007 | Itadani | G02F 1/133528 349/96 |
| 2007/0091236 A1 | 4/2007 | Yano et al. | |
| 2007/0229739 A1 | 10/2007 | Iwamoto | |
| 2007/0263152 A1 | 11/2007 | Mazaki et al. | |
| 2008/0018831 A1 * | 1/2008 | Yano | G02B 5/3083 349/96 |
| 2008/0043332 A1 | 2/2008 | Chiba et al. | |
| 2009/0213312 A1 | 8/2009 | Joubert et al. | |
| 2009/0279030 A1 * | 11/2009 | Toyama | C08G 18/61 349/117 |
| 2009/0316095 A1 * | 12/2009 | Do | G02F 1/13363 349/118 |
| 2010/0053508 A1 * | 3/2010 | Choi | G02F 1/133634 349/96 |
| 2010/0157207 A1 * | 6/2010 | Lee | G02F 1/13363 349/96 |
| 2010/0157208 A1 | 6/2010 | Hanne | |
| 2011/0001906 A1 | 1/2011 | Chang et al. | |
| 2011/0255038 A1 * | 10/2011 | Chang | G02B 5/3083 349/96 |

FOREIGN PATENT DOCUMENTS

| | | |
|---|---|---|
| JP | 2005189632 A | 7/2005 |
| JP | 2006-84700 A | 3/2006 |
| JP | 2006084700 | 3/2006 |
| JP | 2006084700 A | 3/2006 |
| JP | 2006-524347 A | 10/2006 |
| JP | 2006524347 A | 10/2006 |
| KR | 1020050049137 A | 5/2005 |
| KR | 1020050073221 A | 7/2005 |
| KR | 1020060064547 A | 6/2006 |
| KR | 1020060130502 A | 12/2006 |
| WO | 2005038517 A1 | 4/2005 |
| WO | 2005-050299 A1 | 6/2005 |
| WO | 2005050299 A1 | 6/2005 |
| WO | 2008-156011 A1 | 12/2008 |
| WO | 2008156011 A1 | 12/2008 |
| WO | WO 2008153201 A1 * 12/2008 ....... G02F 1/133632 |

* cited by examiner

POLARISING PLATE FOR A PLANAR-SWITCH MODE LCD, AND A PLANAR-SWITCH MODE LCD COMPRISING THE SAME

This application is a Continuation of U.S. application Ser. No. 13/142,224, filed Jun. 24, 2011, which is a National Stage Entry of International Application No. PCT/KR2009/007810, filed Dec. 24, 2009, and claims the benefit of Korean Patent Application No. 10-2008-0134347, filed on Dec. 26, 2008, and Korean Patent Application No. 10-2009-0129654, filed on Dec. 23, 2009, all of which are hereby incorporated by reference in their entirety for all purposes as if fully set forth herein.

TECHNICAL FIELD

The present invention relates to a polarizer for use in an in-plane switching-liquid crystal display (IPS-LCD), and more particularly, to a polarizer for use in an IPS-LCD, which is capable of remarkably improving a contrast ratio and a color variation rate in a tilt angle, and an IPS-LCD including the same.

BACKGROUND ART

An IPS-LCD refers to an LCD in which liquid crystals are initially aligned in a horizontal direction with respect to a glass substrate and at a certain angle with respect to an electrode, and an electric field is formed in parallel to the glass substrate.

Figure 1:
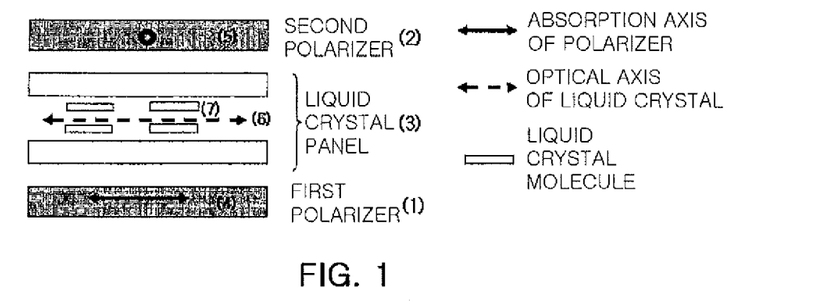
FIG. 1 is a view illustrating a structure of a conventional IPS-LCD.

FIG. 1 illustrates a basic structure of a conventional IPS-LCD.

As illustrated in FIG. 1, the IPS-LCD includes a first polarizer 1, a second polarizer 2, and a liquid crystal panel 3. An absorption axis 4 of the first polarizer 1 and an absorption axis 5 of the second polarizer 2 are disposed perpendicular to each other. Also, the absorption axis 4 of the first polarizer and an optical axis 6 of a liquid crystal cell are disposed in parallel to each other.

Meanwhile, the liquid crystal panel 3 is manufactured by horizontally aligning liquid crystals 7 between two substrates, and an optical axis of the liquid crystal within the liquid crystal cell is in parallel to the polarizer.

Such IPS-LCD is categorized into an IPS-LCD, a super IPS-LCD, and a fringe field switching-LCD (FFS-LCD) according to an active matrix drive electrode mode including an electrode pair. The present invention is applied to all of the types of IPS-LCDS.

Since liquid crystals within the IPS-LCD are horizontally aligned, refractive index anisotropy according to viewing angle does not greatly change. Thus, the IPS-LCD is advantageous in that the difference in refractive index anisotropy between liquid crystals is small and a viewing angle is wide, as compared with a Twisted Nematic (TN) mode in which liquid crystals are vertically aligned. However, when viewed from the side, the alignment of the liquid crystals is asymmetric. Hence, color variation occurs at both a left side and a right side, and light leakage is relatively large with respect to a tilt angle. Consequently, a contrast ratio is lowered at a tilt angle.

DISCLOSURE

Technical Problem

An aspect of the present invention provides a polarizer for use in an IPS-LCD, which is capable of improving a contrast characteristic in a tilt angle, and an IPS-LCD including the same.

Technical Solution

According to an aspect of the present invention, there is provided a polarizer for use in an IPS-LCD, including: a polarizing element; and a retardation film laminate attached to a surface of the polarizing element, wherein the retardation film laminate includes a combination of a +B film and a −B film or a combination of a +B film and a +A film.

The +B film may have an in-plane retardation value of 50 nm to 150 nm and a thickness retardation value of 50 nm to 150 nm at a wavelength of 550 nm, the −B film may have an in-plane retardation value of 30 nm to 70 nm and a thickness retardation value of −30 nm to −120 nm at a wavelength of 550 nm, and the +A film may have an in-plane retardation value of 50 nm to 150 nm at a wavelength of 550 nm.

$N_z$ values of the +B film, the −B film, and the +A film may be greater than 0 and equal to or less than 4, the $N_z$ value being defined as $$N_z = |1-(R_{th}/R_{in})|$$

where $R_{th}$ denotes a thickness retardation value, and $R_{in}$ denotes an in-plane retardation value.

The +B film, the −B film, and the +A film may include a stretched polymer film or a liquid crystal film.

According to another aspect of the present invention, there is provided an IPS-LCD including: a liquid crystal panel including a top substrate, a bottom substrate, and a liquid crystal cell disposed between the top substrate and the bottom substrate and filled with liquid crystals having a positive dielectric anisotropy, the liquid crystal panel operating in an IPS mode; a first polarizer attached to one surface of the liquid crystal panel and in which an absorption axis of a polarizing element is arranged in parallel to an optical axis of the liquid crystal cell; and a second polarizer attached to the other surface of the liquid crystal cell and having a polarizing element an absorption of which is arranged perpendicular to the optical axis of the liquid crystal cell, wherein the second polarizer includes a polarizing element and a retardation film laminate attached to a surface of the polarizing element, and the retardation film laminate includes a combination of a +B film and a −B film or a combination of a +B film and a +A film.

The first polarizer may include: a polarizing element; and a transparent isotropic protection film attached to one surface or both sides of the polarizing element. The isotropic protection film may include a zero TAC film having no retardation value, an unstretched COP film, or an acryl film.

The second polarizer may be attached to a transparent isotropic protection film on the other surface of the polarizer to which the laminate of the +B film and the −B film or the laminate of the +B film and the +A film is not attached. The isotropic protection film may include a zero TAC film having no retardation value, an unstretched COP film, or an acryl film.

The retardation film laminate may include a combination of a +B film and a +A film. In this case, the optical axes of the +B film and the +A film may be parallel to each other.

In this case, the optical axes of the +B film and the +A film may be arranged in parallel to an absorption axis of the polarizing element of the second polarizer, and the +B film and the +A film may be sequentially laminated on the polarizing element of the second polarizer. At this time, the +A film may have an in-plane retardation value of 50 nm to 150 nm at a wavelength of 550 nm, and the +B film may have an in-plane retardation value of 50 nm to 150 nm and a thickness retardation value of 50 nm to 150 nm at a wavelength of 550 nm.

Meanwhile, optical axes of the +B film and the +A film may be perpendicular to an absorption axis of the polarizing element of the second polarizer, and the +A film and the +B film may be sequentially laminated on the polarizing element of the second polarizer. At this time, the +A film may have an in-plane retardation value of 50 nm to 150 nm at a wavelength of 550 nm, and the +B film may have an in-plane retardation value of 50 nm to 150 nm and a thickness retardation value of 50 nm to 150 nm at a wavelength of 550 nm.

The retardation film laminate may include a combination of a +B film and a −B film, and the optical axes of the +B film and the −B film may be parallel to each other.

The optical axes of the +B film and the −B film may be parallel to an absorption axis of the polarizing element of the second polarizer, and the +B film and the −B film may be sequentially laminated on the polarizing element of the second polarizer. At this time, the +B film may have an in-plane retardation value of 50 nm to 150 nm and a thickness retardation value of 50 nm to 150 nm at a wavelength of 550 nm, and the −B film may have an in-plane retardation value of 30 nm to 70 nm and a thickness retardation value of −30 nm to −120 nm at a wavelength of 550 nm.

Meanwhile, optical axes of the +B film and the −B film may be perpendicular to an absorption axis of the polarizing element of the second polarizer, and the −B film and the +B film may be sequentially laminated on the polarizing element of the second polarizer. At this time, the +B film may have an in-plane retardation value of 50 nm to 150 nm and a thickness retardation value of 50 nm to 150 nm at a wavelength of 550 nm, and the −B film may have an in-plane retardation value of 30 nm to 70 nm and a thickness retardation value of −30 nm to −120 nm at a wavelength of 550 nm.

Advantageous Effects

The use of the polarizer for the IPS-LCD can remarkably improve the contrast and color variation in the tilt direction.

BEST MODE

The present inventors conducted continuous research into improvement of a contrast ratio in a tilt direction of an IPS-LCD and confirmed that a contrast ratio and color variation characteristic could be remarkably improved in a tilt direction of an IPS-LCD when a retardation film laminate including a +B film and a −B film or a retardation film laminate including a +A film and a −A film was attached to a surface of a polarizing element. Then, the present inventors completed the present invention.

Prior to a description of the present invention, terms used herein will be defined.

Figure 2:
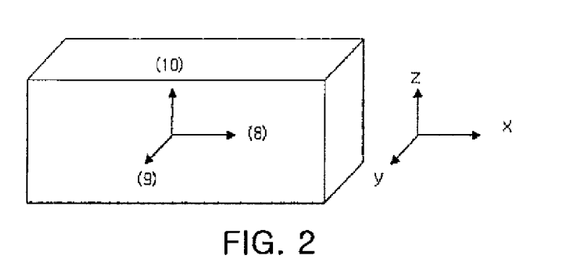
FIG. 2 is a view explaining a refractive index of a retardation film.

FIG. 2 is a view explaining refractive indexes of viewing angle compensation films. As illustrated in FIG. 2, an x-axis refractive index 8, a y-axis refractive index 9, and a z-axis refractive index 10 are denoted by $n_x$, $n_y$, and $n_z$, respectively. The characteristics of the films are determined according to the magnitudes of the refractive indexes of the respective axes. When an x-axis refractive index, a y-axis refractive index, and a thick refractive index in the in-plane refractive indexes are denoted by $n_x$, $n_y$, and $n_z$, respectively, the term "+A film" used herein refers to a film meeting $n_x > n_y = n_z$. The term "−B film" used herein refers to a film meeting $n_x > n_y > n_z$, and the term "+B film" used herein refers to a film meeting $n_y < n_x \neq n_z$.

An in-plane retardation value $R_{in}$ used herein is defined by a difference of two refractive indexes $n_x$ and $n_y$ and a thickness of a film. Specifically, the in-plane retardation value $R_{in}$ is expressed as Equation (1) below.

$$R_{in} = (n_x - n_y) \times d \tag{1}$$

where d is a thickness of a film

Also, a thickness retardation value $R_{th}$ used herein is defined by a difference of an in-plane refractive index and a thickness refractive index and a thickness of a film. Specifically, the thickness retardation value $R_{th}$ is expressed as Equation (2) below.

$$R_{th} = (n_z - n_y) \times d \tag{2}$$

where d is a thickness of a film

Also, $N_z$ is a value related to a ratio of the in-plane retardation value and the thickness retardation value. Specifically, $N_z$ is defined as Equation (3) below.

$$N_z = |1 - (R_{th}/R_{in})| \tag{3}$$

Hereinafter, the present invention will be described in detail.

A polarizer according to the present invention includes a polarizing element and a retardation film laminate attached to a surface of the polarizing element. The retardation film laminate includes a combination of a +B film and a −B film or a combination of a +B film and a +A film.

The +B film may have an in-plane retardation value of 50 nm to 150 nm, specifically 60 nm to 150 nm, more specifically 70 nm to 150 nm, and a thickness retardation value of 50 nm to 150 nm, specifically 60 nm to 150 nm, more specifically 70 nm to 150 nm, at a wavelength of 550 nm.

Meanwhile, the −B film may have an in-plane retardation value of 30 nm to 70 nm, specifically 40 nm to 70 nm, and a thickness retardation value of −30 nm to −120 nm, specifically −40 nm to −80 nm, more specifically −40 nm to −60 nm, at a wavelength of 550 nm.

Also, the +A film may have an in-plane retardation value of 50 nm to 150 nm, specifically, 60 nm to 140 nm, more specifically 80 nm to 120 nm, at a wavelength of 550 nm.

FIGS. 3 to 6 illustrate polarizers according to implementations of the present invention.

Figure 3:
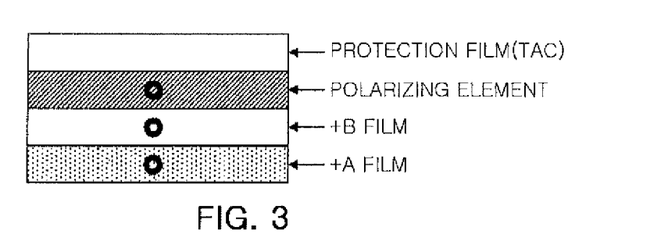
FIG. 3 is a view illustrating a polarizer according to a first implantation of the present invention.
Figure 4:
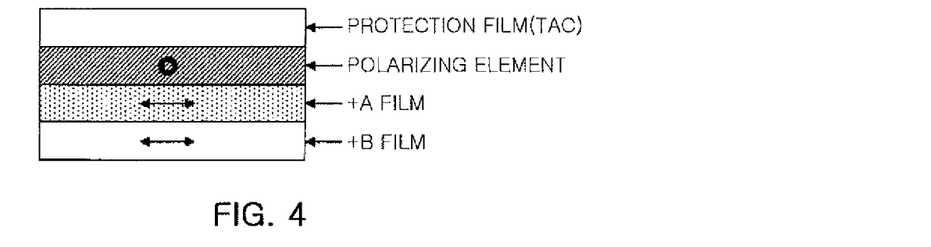
FIG. 4 is a view illustrating a polarizer according to a second implementation of the present invention.

As illustrated in FIGS. 3 and 4, the polarizer according to the implementations of the present invention may include a polarizing element and a laminate of a +B film and a +A film attached to a surface of the polarizing element.

The polarizing element may be a stretched polyvinyl alcohol film.

Meanwhile, in this case, the +B film may have an in-plane retardation value of 50-150 nm, specifically 60 nm to 120 nm, more specifically 70-120 nm, and a thickness retardation value of 50 nm to 150 nm, specifically 60 nm to 120 nm, more specifically 70 nm to 120 nm, at a wavelength of 550 nm, and the +A film may have an in-plane retardation value of 50 nm to 150 nm, specifically 60 nm to 140 nm, more specifically 80 nm to 120 nm, at a wavelength of 550 nm. Optical axes of the +B film and the +A film may be arranged in parallel to each other.

Meanwhile, as illustrated in FIG. 3, the +B film and the +A film may be sequentially laminated on the polarizing element. Also, as illustrated in FIG. 4, the +A film and the +B film may be sequentially laminated on the polarizing element.

When the +B film and the +A film are sequentially laminated as illustrated in FIG. 3, the optical axes of the +B film and the +A film may be arranged in parallel to the absorption axis of the polarizing element. When the +A film and the +B film are sequentially laminated as illustrated in FIG. 4, the optical axes of the +B film and the +A film may be arranged perpendicular to the absorption axis of the polarizing element.

Figure 5:
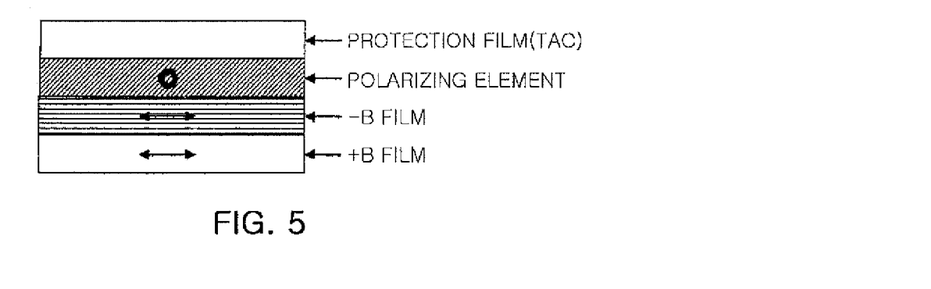
FIG. 5 is a view illustrating a polarizer according to a third implementation of the present invention.
Figure 6:
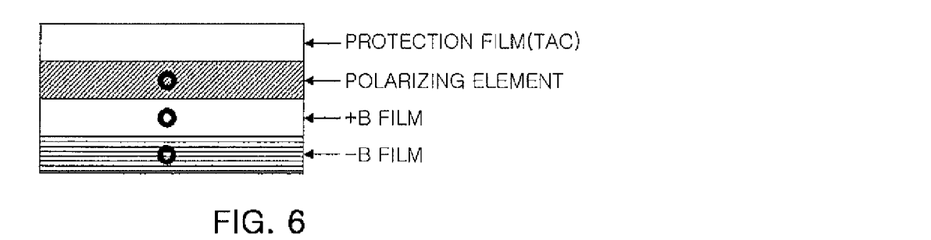
FIG. 6 is a view illustrating a polarizer according to a fourth implementation of the present invention.

As illustrated in FIGS. 5 and 6, the polarizers according to the present invention include a polarizing element and a laminate of a +B film and a −B film attached to a surface of the polarizing element.

The polarizing element may be a stretched polyvinyl alcohol film; however, the invention is not limited thereto. A variety of polarizing elements used in the art to which the invention pertains may be used herein.

Also, the +B film may have an in-plane retardation value of 50 nm to 150 nm, specifically 70 nm to 150 nm, and a thickness retardation value of 50 nm to 150 nm, specifically 70 nm to 150 nm, at a wavelength of 550 nm. The −B film may have an in-plane retardation value of 30 nm to 70 nm, specifically 40 nm to 70 nm, and a thickness retardation value of −30 nm to −120 nm, specifically −40 nm to −70 nm, at a wavelength of 550 nm.

Meanwhile, when the −B film and the +B film are sequentially laminated on the polarizing element, the optical axes of the −B film and the +B film may be arranged in parallel to each other, and the absorption axes of the films and the polarizing element may be arranged perpendicular to each other.

On the other hand, when the +B film and the −B film are sequentially laminated on the polarizing element as illustrated in FIG. 6, the optical axes of the −B film and the +B film and the absorption axis of the polarizing element may be arranged in parallel to each other.

Meanwhile, the +B film, the −B film, and the +A film may have the $N_z$ value in the range of 0 to 4. Specifically, the +B film meets $0 < N_z \leq 2$, the +A film meets $0 < N_x \leq 2$, and the −B film meets $0 < N_z < 4$.

When the $N_z$ value of the films exceeds 4, an optical compensation function in a contrast ratio or a color variation value is not well worked.

Meanwhile, the +B film, the −B film, and the +A film may include a stretched polymer film or a liquid crystal film which is commonly used as a retardation film. That is, examples of the +B film and the −B film may include a stretched polymer film, such as a biaxially stretched cyclo-olefin polymer (COP) film, a triacetate cellulose (TAC) film, an acryl-based film, etc., or a liquid crystal film. Examples of the +A film may include a stretched polymer film, such as a monoaxially stretched COP film, a TAC film, an acryl-based film, etc., or a liquid crystal film. The use of the stretched polymer film as the +A film, the +B film, and the −B film is suitable in view of the manufacturing costs involved.

Meanwhile, the retardation film laminate according to the present invention performs a polarizer protection film function. The polarizer protection film protects the polarizing element and may be formed of any material such it has a polarizer protection function and is transparent.

The polarizer according to the present invention may further include a protection film on the other surface of the polarizer to which the retardation film laminate is not attached. Examples of the protection film may include an isotropic film, such as an unstretched COP film, a zero TAC film having no retardation value, or an acryl film. This is because optical characteristics of the IPS-LCD are also influenced by the protection film used for protecting the polarization film.

The present invention also provides an IPS-LCD including the above-described polarizer.

The IPS-LCD according to the present invention includes a liquid crystal panel, a first polarizer, and a second polarizer. The liquid crystal panel includes a top substrate, a bottom substrate, and a liquid crystal cell disposed between the top substrate and the bottom substrate and filled, with liquid crystals having a positive dielectric anisotropy. The first polarizer is attached to one surface of the liquid crystal panel, and its absorption axis is parallel to an optical axis of the liquid crystal cell. The second polarizer is attached to the other surface of the liquid crystal cell, and its absorption axis is perpendicular to the optical axis of the liquid crystal cell. The second polarizer includes a polarizing element and a retardation film laminate attached to a surface of the polarizing element. The retardation film laminate includes a combination of a +B film and a −B film or a combination of a +B film and a +A film.

At this time, a protection film including a zero TAC film having no retardation value, an unstretched COP film or an acryl film may be attached to one side or both sides of the first polarizer. A protection film including a zero TAC film having no retardation value, an unstretched COP film or an acryl film may be attached to a surface of the second polarizer to which the retardation film laminate is not attached.

FIGS. 7 to 10 illustrate IPS-LCDs according to implementations of the present invention.

Figure 7:
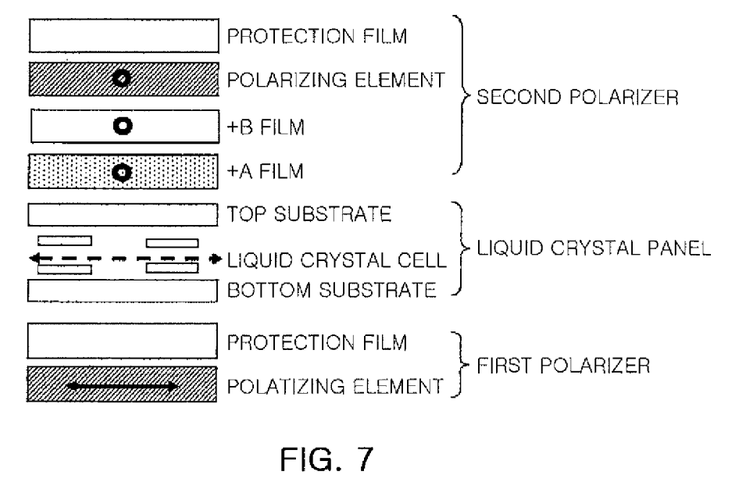
FIG. 7 is a view illustrating an IPS-LCD according to a first implementation of the present invention.
Figure 8:
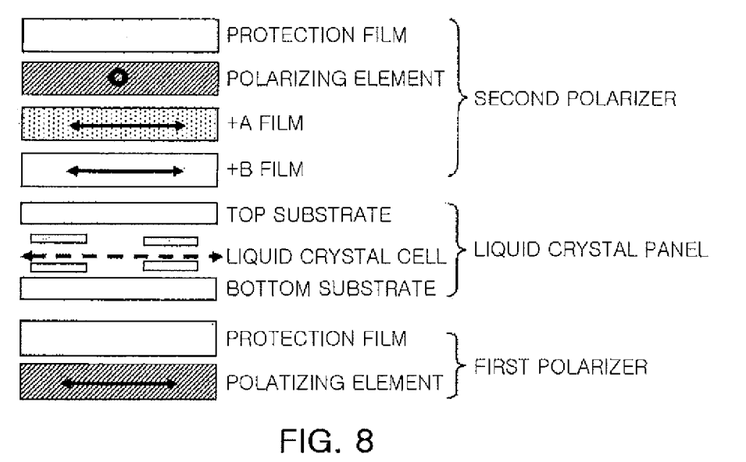
FIG. 8 is a view illustrating an IPS-LCD according to a second implementation of the present invention.

FIGS. 7 and 8 illustrate IPS-LCDs including a polarizer having a laminate of a +B film and a +A film.

As illustrated in FIG. 7, the IPS-LCD may include a second polarizer having a film laminate in which a +B film and a +A film are sequentially laminated on a polarizing element. In this case, the optical axes of the +B film and the +A film may be arranged in parallel to each other, and optical axes of the +B film and the +A film and absorption axes of the polarizing element of the second polarizer may be arranged in parallel to each other.

Also, in this case, the +A film may have an in-plane retardation value of 50-150 nm at a wavelength of 550 nm, and the +B film may have an in-plane retardation value of 50 nm to 150 nm and a thickness retardation value of 50 nm to 150 nm at a wavelength of 550 nm. In addition, the +A film may have an in-plane retardation value of 60 nm to 140 nm, specifically 70 nm to 120 nm, more specifically 80 nm to 110 nm, at a wavelength of 550 nm, and the +B film may have an in-plane retardation value of 60 nm to 140 nm, specifically 70 nm to 120 nm, more specifically 80 nm to 110 nm, and a thickness retardation value of 60 nm to 140 nm, specifically 70 nm to 120 nm, more specifically 80 nm to 110 nm, at a wavelength of 550 nm.

Also, as illustrated in FIG. 8, the IPS-LCD may include a second polarizer having a film laminate in which a +A film and a +B film are sequentially laminated on a polarizing element. In this case, the optical axes of the +B film and the +A film may be arranged in parallel to each other, and optical axes of the +B film and the +A film and absorption axes of the polarizing element of the second polarizer may be arranged perpendicular to each other. The +A film may have an in-plane retardation value of 50-150 nm at a wavelength of 550 nm, and the +B film may have an in-plane retardation value of 50 nm to 150 nm and a thickness retardation value of 50 nm to 150 nm at a wavelength of 550 nm. In particular, the +A film may have an in-plane retardation value of 60 nm to 140 nm, specifically 70 nm to 120 nm, more specifically 80 nm to 110 nm, at a wavelength of 550 nm, and the +B film may have an in-plane retardation value of 60 nm to 140 nm, specifically 60 nm to 120 nm, and a thickness retardation value of 60 nm to 140 nm, specifically 60 nm to 120 nm, at a wavelength of 550 nm.

Figure 9:
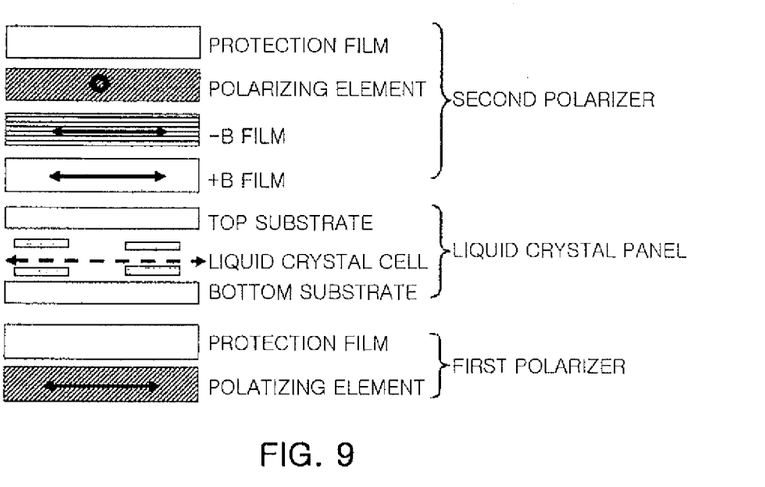
FIG. 9 is a view illustrating an IPS-LCD according to a third implementation of the present invention.
Figure 10:
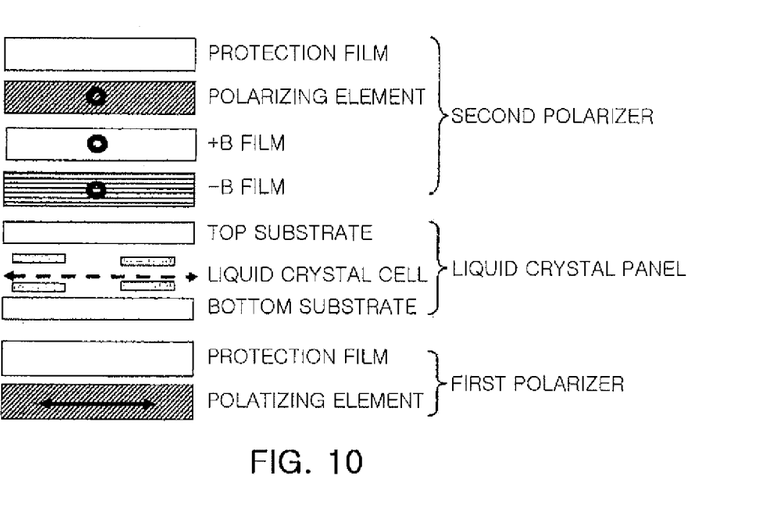
FIG. 10 is a view illustrating an IPS-LCD according to a fourth implementation of the present invention.

FIGS. 9 and 10 illustrate IPS-LCDs including a polarizer having a laminate of a +B film and a −B film. Specifically, FIG. 9 illustrates a case in which a −B film and a +B film are sequentially laminated on a polarizing element of a second polarizer, and FIG. 10 illustrates a case in which a +B film and a −B film are sequentially laminated on a polarizing element.

As illustrated in FIG. 9, the IPS-LCD may include a second polarizer having a film laminate in which a −B film and a +B film are sequentially laminated on a polarizing element. In this case, the optical axes of the +B film and the −B film may be arranged in parallel to each other, and optical axes of the +B film and the −B film and absorption axes of the polarizing element of the second polarizer may be arranged perpendicular to each other.

Also, in this case, the −B film may have an in-plane retardation value of 30-70 nm and a thickness retardation value of −30 nm to −120 nm at a wavelength of 550 nm, and the +B film may have an in-plane retardation value of 50 nm to 150 nm and a thickness retardation value of 50 nm to 150 nm at a wavelength of 550 nm. In addition, the −B film may have an in-plane retardation value of 40 nm to 70 nm, specifically 40 nm to 45 nm, and a thickness retardation value of −40 nm to −70 nm, specifically −40 nm to −50 nm, at a wavelength of 550 nm, and the +B film may have an in-plane retardation value of 70 nm to 150 nm, specifically 100 nm to 150 nm, and a thickness retardation value of 70 nm to 150 nm, specifically 100 nm to 150 nm, at a wavelength of 550 nm.

Also, as illustrated in FIG. 10, the IPS-LCD may include a second polarizer having a film laminate in which a +B film and a −B film are sequentially laminated on a polarizing element. In this case, the optical axes of the +B film and the −B film may be arranged in parallel to each other, and optical axes of the +B film and the −B film and absorption axes of the polarizing element of the second polarizer may be arranged in parallel to each other.

In this case, the −B film may have an in-plane retardation value of 30-70 nm and a thickness retardation value of −30 nm to −120 nm at a wavelength of 550 nm, and the +B film may have an in-plane retardation value of 50 nm to 150 nm and a thickness retardation value of 50 nm to 150 nm at a wavelength of 550 nm. In particular, the −B film may have an in-plane retardation value of 40 nm to 70 nm, specifically 50 nm to 70 nm, and a thickness retardation value of −40 nm to −70 nm, specifically −50 nm to −65 nm, at a wavelength of 550 nm, and the +B film may have an in-plane retardation value of 70 nm to 150 nm, specifically 75 nm to 90 nm, and a thickness retardation value of 70 nm to 150 nm, specifically 75 nm to 90 nm, at a wavelength of 550 nm.

Meanwhile, in the IPS-LCD, the first polarizer may be disposed at a backlight side or an observer side.

MODE FOR INVENTION

Hereinafter, specific embodiments of the present invention will be described in detail.

Comparative Example 1

A minimum contrast ratio was simulated at a tilt angel of 75° with respect to all longitudinal angles in an IPS-LCD to which a first polarizer and a second polarizer were attached to both sides of a liquid crystal panel.

Simulation conditions were as follows.

(1) Liquid crystal cell: cell gap: 3.4 μm, pretilt angle: 1.4°, dielectric anisotropy (Δ∈)=+7, birefringence (Δn) of liquid crystal at 550 nm wavelength: 0.1

(2) First polarizer: Two sheets of TAC films having a thickness of 50 μm and a retardation value of almost zero were used as a protection film.

(3) Second polarizer: Two sheets of TAC films having a thickness of 50 μm and a retardation value of almost zero were used as a protection film.

Figures 11, 12:
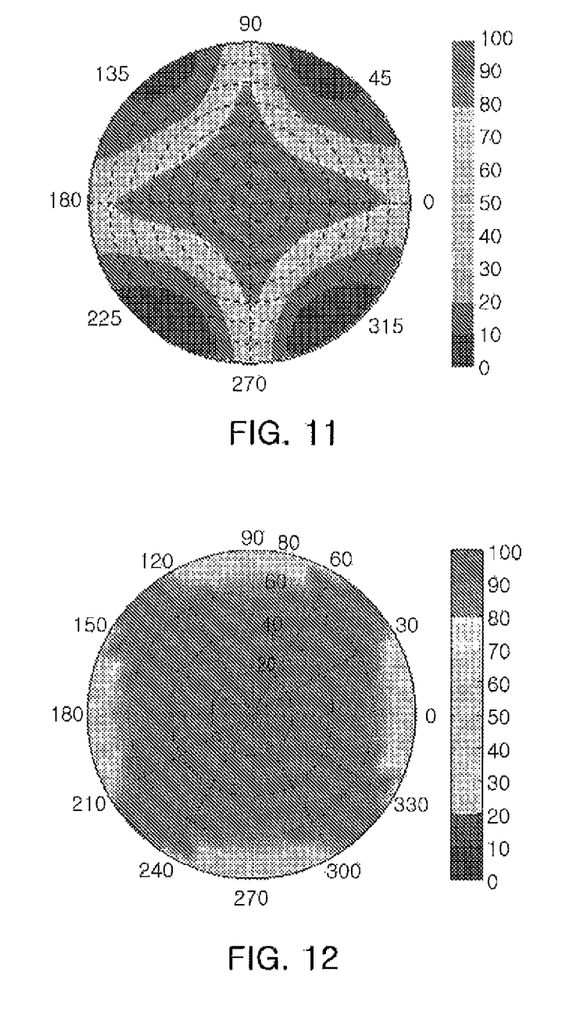
FIG. 11 is a view illustrating a simulation result of an IPS-LCD of comparative example.
FIG. 12 is a view illustrating a simulation result of an IPS-LCD of embodiment 1.

As illustrated in FIG. 11, the simulation result showed that the minimum contrast ratio was about 10:1.

Embodiment 1

The polarizer according to the present invention in which the +B film and the +A film were sequentially laminated on one surface of the polarizing element and the TAC film having a thickness of 50 μm and a retardation value of almost zero was attached to the other surface of the polarizing element was used as the second polarizer. Except for this, the IPS-LCD was manufactured in the same manner as comparative example 1. Using a ray-tracing program, the minimum contrast ratio of the IPS-LCD was simulated in the same manner as comparative example 1.

The +A film and the +B film had the retardation values shown in Table 1 below.

As illustrated in FIG. 12, the simulation result showed that the minimum contrast ratio was 60:1.

TABLE 1

| Retardation value of +A film | Retardation value of +B film |
| --- | --- |
| $R_{in}$ = 80 nm | $R_{in}$ = 80 nm, $R_{th}$ = 80 nm |
| $R_{in}$ = 90 nm | $R_{in}$ = 90 nm, $R_{th}$ = 90 nm |
| $R_{in}$ = 100 nm | $R_{in}$ = 100 nm, $R_{th}$ = 80 nm |
| $R_{in}$ = 110 nm | $R_{in}$ = 110 nm, $R_{th}$ = 110 nm |

Embodiment 2

The polarizer according to the present invention in which the +A film, and the +B film were sequentially laminated on one surface of the polarizing element and the TAC film having a thickness of 50 μm and a retardation value of almost zero was attached to the other surface of the polarizing element was used as the second polarizer. Except for this, the IPS-LCD was manufactured in the same manner as comparative example 1. Using a ray-tracing program, the minimum contrast ratio of the IPS-LCD was simulated in the same manner as comparative example 1.

The +A film and the +B film had the retardation values shown in Table 2 below.

Figure 13:
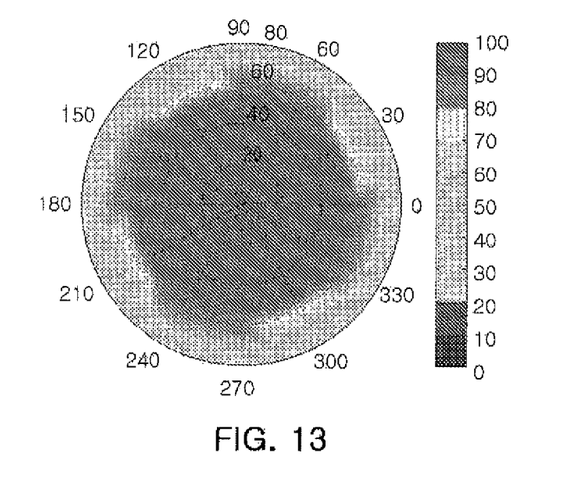
FIG. 13 is a view illustrating a simulation result of an IPS-LCD of embodiment 2.

As illustrated in FIG. 13, the simulation result showed that the minimum contrast ratio was 60:1.

TABLE 2

| Retardation value of +B film | Retardation value of +A film |
| --- | --- |
| $R_{in}$ = 60 nm, $R_{th}$ = 60 nm | $R_{in}$ = 70 nm |
| $R_{in}$ = 80 nm, $R_{th}$ = 80 nm | $R_{in}$ = 80 nm |
| $R_{in}$ = 100 nm, $R_{th}$ = 100 nm | $R_{in}$ = 90 nm |
| $R_{in}$ = 120 nm, $R_{th}$ = 120 nm | $R_{in}$ = 100 nm |

Embodiment 3

The polarizer according to the present invention in which the −B film and the +B film were sequentially laminated on one surface of the polarizing element and the TAC film having a thickness of 50 μm and a retardation value of almost zero was attached to the other surface of the polarizing element was used as the second polarizer. Except for this, the IPS-LCD was manufactured in the same manner as comparative example 1. Using a ray-tracing program, the minimum contrast ratio of the IPS-LCD was simulated in the same manner as comparative example 1.

The −B film and the +B film had the retardation values shown in Table 3 below.

Figure 14:
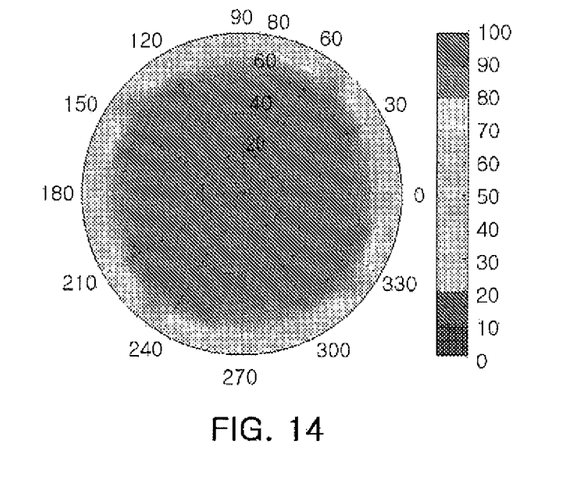
FIG. 14 is a view illustrating a simulation result of an IPS-LCD of embodiment 3.

As illustrated in FIG. 14, the simulation result showed that the minimum contrast ratio was 60:1.

TABLE 3

| Retardation value of +B film | Retardation value of −B film |
| --- | --- |
| $R_{in}$ = 100 nm, $R_{th}$ = 100 nm | $R_{in}$ = 40 nm, $R_{th}$ = −40 nm |
| $R_{in}$ = 110 nm, $R_{th}$ = 110 nm | $R_{in}$ = 40 nm, $R_{th}$ = −45 nm |
| $R_{in}$ = 120 nm, $R_{th}$ = 120 nm | $R_{in}$ = 40 nm, $R_{th}$ = −50 nm |
| $R_{in}$ = 130 nm, $R_{th}$ = 130 nm | $R_{in}$ = 45 nm, $R_{th}$ = −40 nm |
| $R_{in}$ = 140 nm, $R_{th}$ = 140 nm | $R_{in}$ = 45 nm, $R_{th}$ = −45 nm |
| $R_{in}$ = 150 nm, $R_{th}$ = 150 nm | $R_{in}$ = 45 nm, $R_{th}$ = −50 nm |

Embodiment 4

The polarizer according to the present invention in which the +B film and the −B film were sequentially laminated on one surface of the polarizing element and the TAC film having a thickness of 50 μm and a retardation value of almost zero was attached to the other surface of the polarizing element was used as the second polarizer. Except for this, the IPS-LCD was manufactured in the same manner as comparative example 1. Using a ray-tracing program, the minimum contrast ratio of the IPS-LCD was simulated in the same manner as comparative example 1.

The +B film and the −B film had the retardation values shown in Table 4 below.

Figure 15:
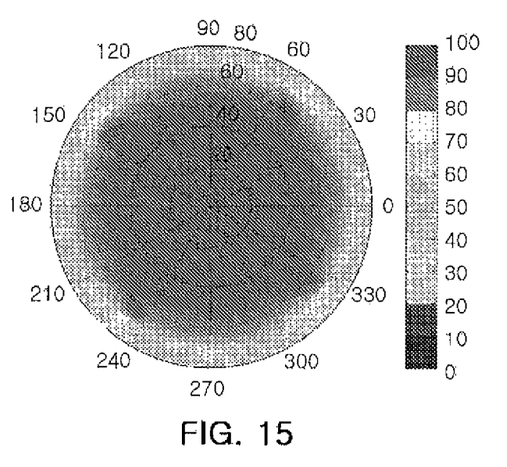
FIG. 15 is a view illustrating a simulation result of an IPS-LCD of embodiment 4.

As illustrated in FIG. 15, the simulation result showed that the minimum contrast ratio was 50:1.

TABLE 4

| Retardation value of −B film | Retardation value of +B film |
| --- | --- |
| $R_{in}$ = 50 nm, $R_{th}$ = −50 nm | $R_{in}$ = 75 nm, $R_{th}$ = 75 nm |
| $R_{in}$ = 60 nm, $R_{th}$ = −55 nm | $R_{in}$ = 80 nm, $R_{th}$ = 80 nm |
| $R_{in}$ = 65 nm, $R_{th}$ = −60 nm | $R_{in}$ = 85 nm, $R_{th}$ = 85 nm |
| $R_{in}$ = 70 nm, $R_{th}$ = −65 nm | $R_{in}$ = 90 nm, $R_{th}$ = 90 nm |

It can be seen from the simulation results that embodiments 1 to 4 using the polarizers according to the present invention have the improved contrast ratios at the tilt angle as compared with comparative example 1.

While the present invention has been shown and described in connection with the exemplary embodiments, it will be apparent to those skilled in the art that modifications and variations can be made without departing from the spirit and scope of the invention as defined by the appended claims.

The invention claimed is:

1. An IPS-LCD comprising:
a liquid crystal panel comprising a top substrate, a bottom substrate, and a liquid crystal cell disposed between the top substrate and the bottom substrate and filled with liquid crystals having a positive dielectric anisotropy, the liquid crystal panel operating in an IPS mode;
a first polarizer attached to one surface of the liquid crystal panel and in which an absorption axis of a polarizing element is arranged in parallel to an optical axis of the liquid crystal cell; and
a second polarizer attached to the other surface of the liquid crystal cell and having a polarizing element an absorption axis of which is arranged perpendicular to the optical axis of the liquid crystal cell,
wherein the second polarizer comprises a polarizing element and a retardation film laminate attached to a surface of the polarizing element, and the retardation film laminate includes a combination of a +B film and a −B film, said films being in direct contact and laminated on the polarizing element,
wherein the +B film is a film meeting nx>ny, nz>ny and nx≠nz, and the −B film is a film meeting nx>ny>nz, wherein the +B film has a thickness retardation value Rth expressed as Equation (2) below, $$Rth = (nz - ny) \times d \qquad (2)$$

wherein nx, ny and nz are, respectively, an x-axis refractive index, a y-axis refractive index and a z-axis refractive index of the +B film or the −B film and d is a thickness of the +B film, and wherein the +B film has an in-plane retardation value of 50 nm to 150 nm and a thickness retardation value of 50 nm to 150 nm at a wavelength of 550 nm, and the −B film has an in-plane retardation value of 30 nm to 70 nm and a thickness retardation value of −30 nm to −120 nm at a wavelength of 550 nm.

2. The IPS-LCD of claim 1, wherein Nz values of the +B film and the −B film are greater than 0 and equal to or less than 4, the Nz value being defined as $$Nz = |1 - (Rth/Rin)|$$

where Rth denotes a thickness retardation value, and Rin denotes an in-plane retardation value.

3. The IPS-LCD of claim 1, where the +B film and the −B film comprise a stretched polymer film or a liquid crystal film.

4. The IPS-LCD of claim 1, wherein the first polarizer comprises:
a polarizing element; and
a protection film attached to one surface or both sides of the polarizing element, the protection film comprising a transparent isotropic film.

5. The IPS-LCD of claim 1, wherein optical axes of the +B film and the −B film are parallel to each other.

6. The IPS-LCD of claim 5, wherein optical axes of the +B film and the −B film are perpendicular to an absorption axis of the polarizing element of the second polarizer.

7. The IPS-LCD of claim 1, wherein the +B film is a film meeting
nz>nx>ny, and the −B film is a film meeting nx>ny>nz.

8. The IPS-LCD of claim 1, wherein the +B film is a film meeting
nx>nz>ny, and the −B film is a film meeting nx>ny>nz.

9. The IPS-LCD of claim 1, wherein the +B film has an in-plane retardation value of 75 nm to 150 nm at a wavelength of 550 nm and a thickness retardation value of 75 nm to 150 nm at a wavelength of 550 nm, and the −B film has an in-plane retardation value of 40 nm to 70 nm and a thickness retardation value of −65 nm to −40 nm at a wavelength of 550 nm.

* * * * *